(12) United States Patent
Dueck et al.

(10) Patent No.: US 12,480,293 B2
(45) Date of Patent: Nov. 25, 2025

(54) SANITARY DEVICE

(71) Applicant: JOMOO KITCHEN & BATH DEUTSCHLAND GMBH, Munich (DE)

(72) Inventors: Johann Dueck, Feurstenfeldbruck (DE); Fabian Kreuzer, Munich (DE); Thomas Richter, Munich (DE); Benjamin Mohrich, Munich (DE); Daniel Gemmecke, Munich (DE); Muya Hong, Munich (DE); Lin Xiaowei, Fujian (CN)

(73) Assignee: JOMOO KITCHEN & BATH DEUTSCHLAND GMBH, Munich (DE)

( * ) Notice: Subject to any disclaimer, the term of this patent is extended or adjusted under 35 U.S.C. 154(b) by 112 days.

(21) Appl. No.: 18/512,660

(22) Filed: Nov. 17, 2023

(65) Prior Publication Data
US 2024/0084565 A1 Mar. 14, 2024

Related U.S. Application Data

(63) Continuation of application No. PCT/EP2022/062728, filed on May 11, 2022.

(30) Foreign Application Priority Data

May 20, 2021 (DE) .................... 10 2021 113 089.1

(51) Int. Cl.
*E03C 1/05* (2006.01)
*E03C 1/04* (2006.01)
*G06F 3/0362* (2013.01)

(52) U.S. Cl.
CPC ............ *E03C 1/055* (2013.01); *E03C 1/0408* (2013.01); *G06F 3/0362* (2013.01); *E03C 2001/0418* (2013.01)

(58) Field of Classification Search
CPC .................. E03C 1/055; E03C 1/0408; E03C 2001/0418; G06F 3/0362; F16K 11/00; F16K 37/00
(Continued)

(56) References Cited

U.S. PATENT DOCUMENTS

| 4,563,780 A | 1/1986 | Pollack |
| 4,756,030 A | 7/1988 | Juliver |

(Continued)

FOREIGN PATENT DOCUMENTS

| AU | 2012347650 B2 * | 9/2015 | ............. B82Y 30/00 |
| DE | 19702358 A1 | 7/1998 | |

(Continued)

OTHER PUBLICATIONS

International Search Report issued by the European Patent Office for International Patent Application No. PCT/EP2022/062728, mailed Sep. 19, 2022 with English translation.

*Primary Examiner* — Lori L Baker
(74) *Attorney, Agent, or Firm* — Myers Wolin, LLC (57) ABSTRACT

A sanitary device has a programmable electronic control unit that acts on a metering and mixer valve unit. The electronic control unit has a program memory suitable for the retrievable storage of multiple different water dispensing programs and a central data processing unit that acts on at least one actuator that actuates the metering and mixer valve unit. A user interface has a display that has a central display region and a peripheral display region annularly surrounding the central display region, a rotatable setting ring around the display and at least three buttons around the setting ring. The buttons of the user interface comprise a program selection button, an output button and a temperature button. Actuating (Continued)

a button results in the present setting value of the button function in question being displayed in the central display region of the display.

22 Claims, 3 Drawing Sheets (58) Field of Classification Search
USPC .............................. 4/596–597, 567, 615, 670
See application file for complete search history.

(56) References Cited

U.S. PATENT DOCUMENTS

| | | | |
|---|---|---|---|
| RE35,018 E | | 8/1995 | Homan |
| 6,473,917 B1 | * | 11/2002 | Mateina ............... G05D 7/0635 |
| | | | 236/12.12 |
| 8,028,355 B2 | | 10/2011 | Reeder et al. |
| 9,085,881 B2 | | 7/2015 | Hanna et al. |
| 10,323,393 B2 | * | 6/2019 | Thompson ............... G01V 3/08 |
| 10,745,893 B2 | | 8/2020 | Silverstein et al. |
| 2008/0259056 A1 | | 10/2008 | Freier et al. |
| 2013/0170839 A1 | | 7/2013 | Yuan |
| 2014/0124048 A1 | * | 5/2014 | Wawrla ................... E03C 1/055 |
| | | | 137/315.01 |
| 2015/0218784 A1 | | 8/2015 | Mazz et al. |
| 2017/0350103 A1 | | 12/2017 | Lee et al. |

FOREIGN PATENT DOCUMENTS

| | | | | |
|---|---|---|---|---|
| DE | 102016104793 B4 | | 5/2018 | |
| DE | 102017124923 A1 | * | 4/2019 | ........... E03C 1/0404 |
| DE | 102021113091 A1 | * | 11/2022 | ............... E03B 1/04 |
| DE | 102023118353 A1 | * | 1/2025 | ............. E03B 7/075 |
| EP | 2937760 A1 | * | 10/2015 | ............. E03B 7/075 |
| EP | 3088613 A1 | | 11/2016 | |
| EP | 2649246 B1 | | 8/2017 | |
| EP | 3406809 A1 | | 11/2018 | |
| EP | 2104772 B1 | | 7/2020 | |
| EP | 3705642 A1 | | 9/2020 | |
| GB | 2059373 A | * | 4/1981 | ........... B64C 27/463 |
| GB | 2439607 A | * | 1/2008 | ............. G09G 3/006 |
| IT | 1234767 B | * | 5/1992 | ............. F16M 11/04 |
| WO | 2007059051 A2 | | 5/2007 | |
| WO | 2008130349 A1 | | 10/2008 | |
| WO | WO-2010112241 A2 | * | 10/2010 | ............. E03C 1/055 |
| WO | 2011094455 A1 | | 8/2011 | |
| WO | 2014140134 A1 | | 9/2014 | |
| WO | WO-2023001574 A1 | * | 1/2023 | ............. E03C 1/041 |

* cited by examiner

SANITARY DEVICE

CROSS REFERENCE TO RELATED APPLICATIONS

This application is a continuation under 35 U.S.C. § 120 of International Application PCT/EP2022/062728, filed May 11, 2022, which claims priority to German Application No. 10 2021 113 089.1, filed May 20, 2021, the contents of each of which are incorporated by reference herein.

FIELD OF THE INVENTION

The present invention relates to a sanitary facility having a cold-water supply, a hot-water supply, at least one water outlet and a metering and mixing valve unit, which is suitable for influencing the total flow through the water outlet and the ratio of the partial quantity of cold water and the partial quantity of hot water relative to one another in the total flow, wherein a programmable electronic control unit acts on the metering and mixing valve unit.

BACKGROUND

As program-controlled sanitary facilities in the foregoing sense, showers in particular are disclosed in the patent literature (see, for example, DE 197 02 358 A1, EP 3 705 642 A1, US 2017/0350103 A1, EP 3 088 613 A1, U.S. Pat. No. 9,085,881 B2, US Re. 35,018 E, U.S. Pat. Nos. 4,563,780 A, 4,756,030 A, DE 102 016 104 793 B4, U.S. Pat. No. 10,745,893 B2 and EP 2 649 246 B1). For this purpose, the electronic control unit comprises a program memory suitable for storage of several different water-delivery programs (shower programs) capable of being called and a central data-processing unit, which acts on at least one actuator for operation of the metering and mixing valve unit. The shower program to be respectively implemented may then be selected either manually or partly or fully automatically (for example, by integration of automatic user identity recognition or user condition recognition). Especially the user interfaces supporting operator control of the sanitary facility or of the electronic control unit associated therewith are likewise subject matter of the patent literature (see, for example, US 2008/0259056 A1, US 2013/0170839 A1, US 2015/0218784 A1 and WO 2011/094455 A1).

U.S. Pat. No. 8,028,355 B2 discloses an integrated electronic system designed for bathrooms and having a multiplicity of sensors, which record variables of state of the bathroom and communicate associated signals to a control unit. Different sanitary units, such as showers, bathtubs, washbasins, etc., to which user interfaces having a memory for predetermined conditions stored according to user definitions as well as control elements capable of program selection and adaptation are assigned, may be connected to the system.

From EP 2 104 772 B1, a multifunctional fitting and a sanitary system comprising such a multifunctional fitting are known. The multifunctional fitting comprises a fluid-outlet fitting, a control device having several sensors and/or switches in distributed arrangement for operation of the multifunctional fitting, and a display having at least one display element, which is spatially associated with the sensors or switches. Several such display elements are combined here as a display ring.

Even though such program-controlled sanitary facilities were already described previously well over twenty years ago, and even though the need for comfort has likewise already been persistently increasing for a long time within the population target group under consideration, they have not yet found any relevant widespread use, which can be explained by the fact that truly practical program-controlled sanitary facilities do not yet exist. A goal of the present invention is to achieve a remedy in this respect. In other words, the invention has made it an object to provide a program-controlled sanitary facility of the kind mentioned in the introduction that is capable of satisfying practical requirements, especially those existing with respect to handling and use.

SUMMARY

This object may be achieved by a sanitary facility described herein. The sanitary facility disclosed may therefore be characterized not only by the features presented in the introduction but also by the following combination of synergetically cooperating features:

- the electronic control unit comprises a program memory suitable for storage of several different water-delivery programs capable of being called and a central data-processing unit, which acts on at least one actuator for operation of the metering and mixing valve unit;
- a user interface is provided that permits program selection as well as manual modification of the selected water-delivery program;
- the user interface has a display, a setting-selector ring extending around the display and capable of being turned around an axis perpendicular to the display, with a circumferential gripping face accessible radially from outside as well as at least three buttons disposed around the setting-selector ring;
- the setting-selector ring and/or the display can be shifted axially for actuation of a momentary-contact confirmation switch;
- the three buttons of the user interface are designed as program-selection button, as output button and as temperature button, such that, upon their actuation, a signal supplied by a rotary-position transducer of the setting-selector-ring is processed in the central data-processing unit in the sense of a water-delivery program modification, an output modification within a called water-delivery program or a temperature modification within a called water-delivery program;
- the display has a central display region and a peripheral display region surrounding it annularly;
- the peripheral display region comprises at least three segments associated spatially with the buttons and respectively having a function-value status display of the button function in question;
- upon button actuation, a display of the instantaneous setting value of the button function in question appears in the central display region.

For the sanitary facility described herein and the advantages associated therewith, namely the high, heretofore unknown extent of user friendliness, a characteristic combination of structural and control-related features interacting with one another is therefore decisive, wherein the control-related features also specify in the following, where not explicitly described, the corresponding configuration of the programmable electronic control unit. In this respect, aspects relevant to the excellent user friendliness are the easy control capability, which can be achieved intuitively, and the excellent interaction with the user by virtue of the feedback thereto. With respect to these and further advantageous effects and viewpoints of inventive sanitary facilities, reference is made to the following description and especially also to the presentation of preferred embodiments and configurations as well as the explanation of the preferred exemplary embodiment illustrated by diagrams.

According to a first preferred further development, the control unit is configured such that, by button actuation, the function-value status display of the button function in question is extinguished in the associated peripheral display region. Thus the effect achieved by the display of the instantaneous setting value of the button function in question in the central display region is even further intensified.

In another preferred further development of the inventive sanitary facility, its control unit is configured such that the segments of the peripheral display region change color to correspond to the set water-delivery temperature. Thus supplementary information is provided to the user via the display, in fact in a form that intuitively is particularly easy to comprehend even if his or her eyesight is reduced (for example, by taking off eyeglasses or removing contact lenses).

According to yet another preferred further development of the invention, the control unit is configured such that the temperature modification mode is activated, either by confirmation of a selection option and/or automatically at a predetermined time after the last actuation of the user interface. In this way, the control unit is automatically set to ready condition, so to speak, for (manual) modification of the temperature of the delivered water by turning the setting-selector ring, thus taking into account the knowledge that the temperature of the delivered water is a property that is particularly relevant for the comfort of the user. Precisely this high priority of the temperature of the delivered water is taken into consideration by the fact that modification of the water temperature within a called water-delivery program is made particularly easy.

Depending on the individual sanitary facility, the output button of the user interface may be assigned respectively to a different specific control function, so that, after actuation of the output button by turning the setting-selector ring, respectively a different parameter of the programmed water delivery can be modified. Thus—and this proves particularly favorable for bathtubs—the total volume of water delivered via the water outlet, i.e. the level of filling of the bathtub, to mention one example, can be modified by actuating the output button and then turning the setting-selector ring. For showers, on the other hand, it is preferably the flow that is modified in this way, i.e. by means of the setting-selector ring after prior actuation of the output button. The situation is analogous for washing stands/washbasins.

Expediently, a flow sensor is respectively provided downstream from the metering and mixing valve unit, and its measured value is supplied to the central data-processing unit. That is where processing within a flow-regulating circuit can then take place in order to maintain the flowrate (which may have been modified individually) predetermined by the water-delivery program. Processing of the measured value in question within an integration step is likewise conceivable, namely for the purpose of maintaining a total quantity of delivered water predetermined by the water-delivery program (which may have been modified individually). Furthermore, it is expedient to provide a temperature sensor respectively downstream from the metering and mixing valve unit, and to supply its measured value to the central data-processing unit. That is where processing within a temperature-regulating circuit can take place in order to maintain the water temperature (which may have been modified individually) predetermined by the water-delivery program.

According to yet another preferred further development of the present invention, as may be employed especially in showers, the sanitary facility has at least two water outlets and one distributing valve for switching the water delivery between the water outlets, wherein the central data-processing unit acts on at least one actuator operating the distributing valve according to an outlet setting applied at the user interface. Particularly complex shower and water-delivery programs may then respectively define a specific sequence of water delivery via the various water outlets for specific time intervals with respectively different or varying temperatures and/or flowrates. An individual modification of the preprogrammed water delivery via the various outlets is then possible in the way described hereinabove for modification of flowrate, filling volume or water quality; in this respect also, the output button may be definitive, provided it is not otherwise assigned.

With respect to the greatest possible user friendliness, it has proved particularly advantageous when, according to yet another preferred further development of the present invention, the user interface has four buttons disposed around the setting-selector ring, wherein the annular peripheral display region of the display comprises four segments (respectively having a function-value status display of the button function in question) spatially associated with the buttons. The assignment of the four buttons that is ideal for typical application situations of the present invention then depends on the individual sanitary facility. In addition to the program-selection button and the temperature button, a shower has an output button (for modification of the flow) as well as an outlet-selection button (for modification of the water outlet), a bathtub has an output button (for modification of the flow or of the water outlet) as well as a filling-volume button (for modification of the filling volume) and a washing stand/washbasin has an output button (for modification of the flow) as well as a basin-level or filling-volume button (for modification of the basin level or of the filling volume).

With the four buttons, one of which is linked with the program selection, i.e. the selection of a specific water-delivery program from the portfolio stored in the program memory (and possibly specially for the individual user, see below), and the three others are linked with the personal and momentary modification of the called water-delivery program by individual change of particularly characteristic parameters of water delivery, it is possible in a practical way to operate even sanitary facilities that are capable of executing water-delivery programs having a high degree of complexity. This is possible because it has been shown that, for further parameters characteristic of the respective water delivery, the need for modification within the respectively called program is only rather modest, so that—in the interests of user-friendly handling—the possibility of such an intervention into the program is disregarded to this extent in favor of storing a separate water-delivery program modified in just that parameter. Such a parameter of the water-delivery program, which may not be capable of modification via the user interface within the called water-delivery program but can be changed (only) via selection of a different water-delivery program, may consist, for example, in the type or quality of the water. In this sense, it may be provided that various water qualities or water types may be predetermined for different water-delivery programs, for example unfiltered and filtered water or water without or with an additive. This option is quite particularly attractive for sanitary facilities in which the withdrawn water comes into contact with food and/or is used for formulation of meals/beverages, i.e. especially for sanitary facilities installed in kitchens. It will be understood that, in this implementation of the invention, typically two cold-water supplies (delivering different water types/qualities) and two hot-water supplies (delivering different water types/qualities) are connected to the metering and mixing valve unit. The situation is comparable when the sanitary facility comprises a reservoir container for a body-care product plus a connected metering and dispensing device that discharges upstream from the water outlet, wherein the central data-processing unit actuates the metering and dispensing device for at least one of the water-delivery programs.

If it is desired in the individual case, for a sanitary facility in which the user interface in the foregoing sense is provided with four buttons, that modifications going beyond the three parameters of the water delivery capable of modification by means of the buttons in question (and therefore haptically) can be made to the respectively called program, it is expedient to equip the electronic control unit with an acoustic control module that permits voice control. Such an option may also prove advantageous from the viewpoint of redundancy in an emergency, especially in that—even from a distance—actuation of central functions is possible by means of specific commands (e.g. "water stop").

Incidentally, part of the respective water-delivery program stored in and capable of being called from the program memory may also be elements that go beyond the control of water delivery in the narrower sense. For example, lighting devices and/or devices for generation of sound may be activated via appropriate program elements, so that, upon call for a specific water-delivery program to the sanitary facility or in the room, a predetermined lighting and/or sound situation is established.

In the interests of particularly high user comfort, the electronic control unit is provided particularly preferably with an individually executed modification of the modification memory in which the called water-delivery program is stored. The storage mode for this purpose depends on the individual needs, requirements or circumstances. Thus, for example, permanent storage of the respective modification may be achieved, possibly as a supplementary (modified) water-delivery program in addition to the unmodified water-delivery program constituting the basis. However, only temporary storage is also conceivable, for example lasting only until the user in question has left the sanitary facility or the room.

If, in a sanitary facility having several water outlets, one of these can be used by hand (e.g. as a hand-held spray of a shower), then according to yet another preferred further development of the invention an in-use sensor is provided that is associated with that water outlet and generates an in-use signal to be supplied to the central data-processing unit. The data-processing unit is then configured in such a way that—possibly by appropriate modification of the called water-delivery program—the water delivery is switched automatically to the hand-held water outlet as soon as this is removed from an associated holder or the (intended) use is sensed in some other way.

Yet another preferred further development of the invention is characterized in that a user-identification sensor is provided, wherein a user-identification signal generated thereby can be supplied to the central data-processing unit to bring about a person-specific preselection of the water-delivery programs offered for selection to the user interface. Not every user receives the same portfolio of water-delivery programs with correspondingly preset parameters; to the contrary, varied different individually compiled water-delivery program portfolios are presented to the persons using the sanitary facility in question. This facilitates and accelerates program selection and makes it particularly convenient.

This user-identification sensor may rely, for example, on biometric features (e.g. movement patterns, fingerprints, facial patterns, voice patterns, etc.) of the respective user or on technical features such as, for example, recognition codes of personal devices or transponders on personal equipment. In view of the greater need for intimacy typically associated precisely with the use of sanitary facilities, it is particularly preferable for this user identification sensor—if it is designed for sensing of biometric features of the person using the sanitary facility—to be adjustable between a sensing configuration and a blind configuration that can be physically distinguished therefrom. In this sense, it is possible, for example, for a camera designed for sensing of movement patterns or facial patters to be adjustable between a detection configuration extended from a housing or an enclosure and a blind configuration retracted into the housing or into the enclosure. Thus it is directly and immediately obvious for the user whether the sensing of his or her biometric features is activated or deactivated. In this connection, the user identification sensor can be automatically adjusted to its blind configuration, for example by the central data-processing unit, after user identification has been established; automatic adjustment back to the sensing configuration by means of the central data-processing unit may then be initiated, for example, when the person in question leaves the sanitary facility or the room. Another preferred option is that the user identification sensor will be adjusted in situation-based manner to its blind configuration by the central data-processing unit according to criteria defined by the user in question himself or herself.

Furthermore, a timer may be provided, wherein a time signal (date, time) generated thereby can be supplied to the central data-processing unit to bring about a time-specific preselection or presorting of the water-delivery programs offered for selection to the user interface. For this purpose, the user in question assigns specific time preferences to his or her personal water-delivery programs stored in the programmable control system, so that, for example, a different program portfolio is presented to him or her at the user interface on a weekday as compared with a weekend, as is a different program portfolio on the same day in the morning as compared with the evening.

The various programming options, especially the creation of personal water-delivery programs that can be called via the user interface, are preferably executed by the respective user by means of a mobile terminal device, specifically by an app installed thereon. Against this background, the control unit expediently comprises a data-communication interface (e.g. Bluetooth), especially for inputting program data created on or via an external device.

BRIEF DESCRIPTION OF THE DRAWING

The present invention will be explained in more detail in the following on the basis of a preferred exemplary embodiment in the form of a shower illustrated in the drawing, wherein.

DETAILED DESCRIPTION OF THE PREFERRED EMBODIMENTS

Figure 1:
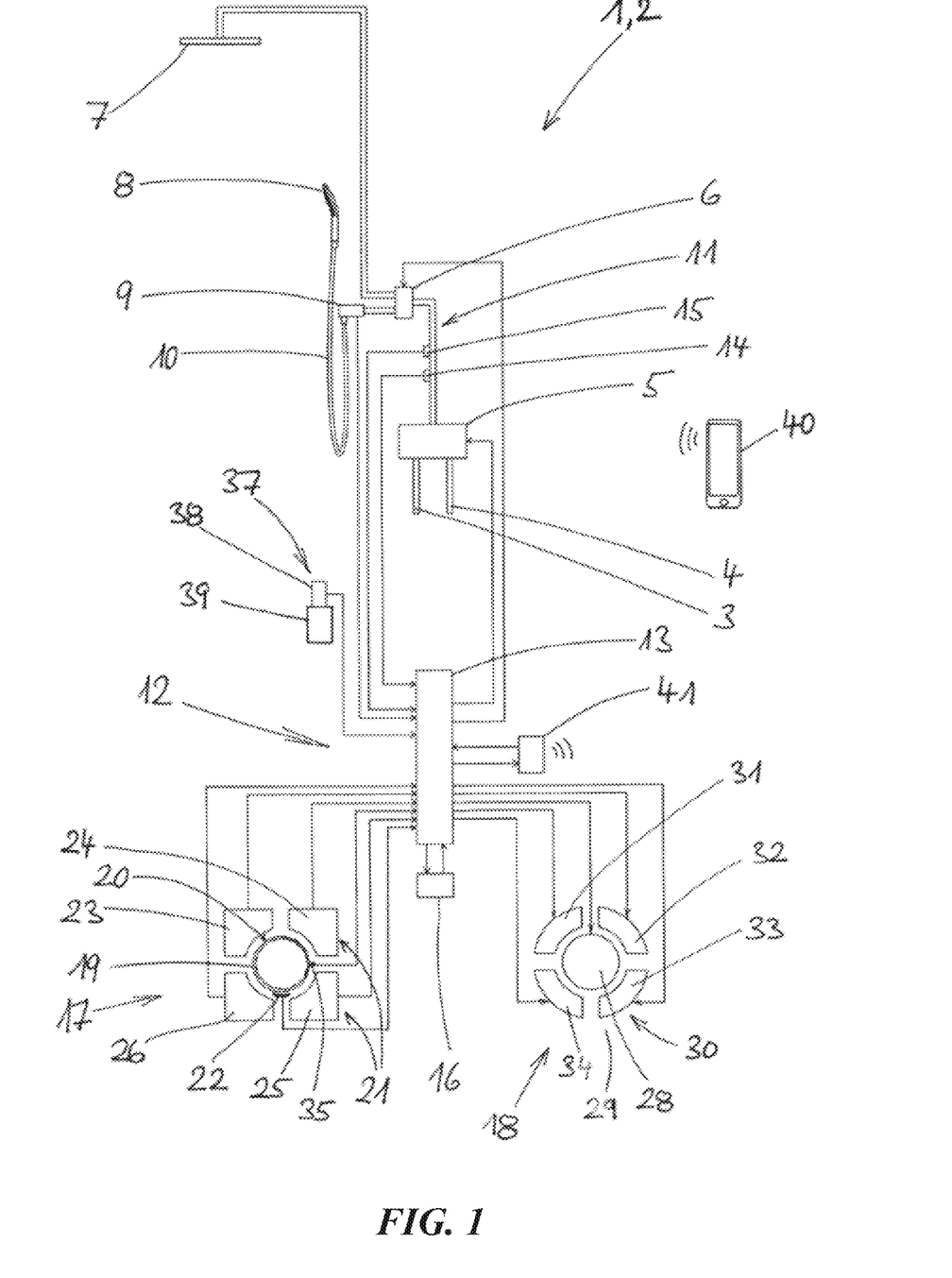
FIG. 1 shows a partly schematic diagram of an inventive sanitary facility designed as a shower.

The sanitary facility 2 designed as shower 1, shown in FIG. 1, is provided—in known manner—with a cold-water supply 3, a hot-water supply 4, a metering and mixing valve unit 5, a distributing valve 6 and two water outlets in the form of an overhead spray 7 and a hand-held spray 8 (plus wall mount/holder 9 and hose 10). The corresponding components are interconnected in well-known and standard manner via water-conveying lines 11.

For control of the water delivery via overhead spray 7 or hand-held spray 8 with a specified flow and a specified temperature, metering and mixing valve unit 5 and distributing valve 6 are actuated by an electronic control unit 12. For this purpose, a central data-processing unit 13 of electronic control unit 12 acts on actuators (not illustrated) associated with metering and mixing valve unit 5 as well as distributing valve 6.

The current water temperature and the current water flow downstream from metering and mixing valve unit 5 are sensed respectively via a temperature sensor 14 and a flowmeter 15, and the measured values in question are supplied for temperature and flow regulation to central data-processing unit 13.

Electronic control unit 12 is programmable in the sense that water delivery via the two water outlets takes place under program control. For this purpose, electronic control unit 12 comprises a program memory 16 that is suitable for storage of several different water-delivery programs capable of being called, and it communicates with central data-processing unit 13. Furthermore, a user interface 17 that permits selection of the water-delivery program to be executed as well as manual modification thereof communicates with central data-processing unit 13.

Figure 2:
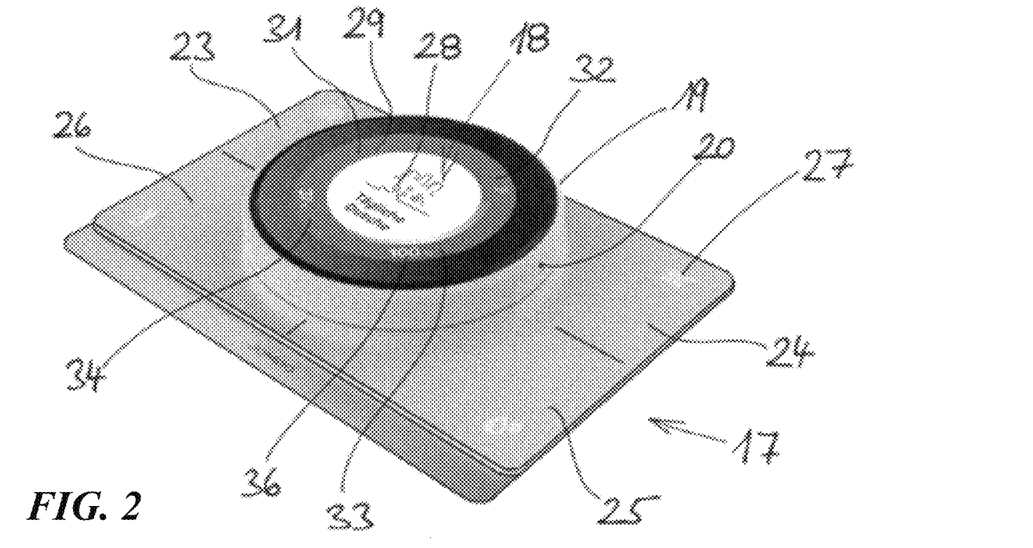
FIG. 2 shows the user interface of the shower according to FIG. 1 in perspective view.
Figure 3A:
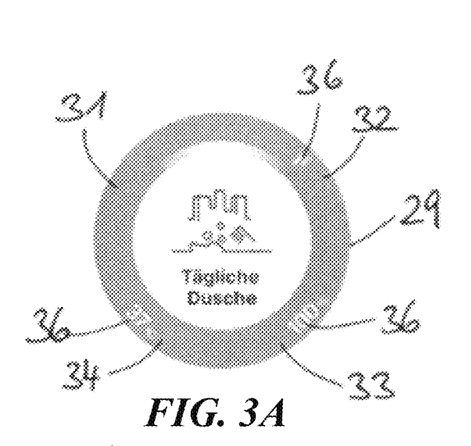
FIGS. 3A, 3B, 3C, and 3D show the display of the user interface according to FIG. 2 in different operating phases in the form of the four subordinate.
Figure 3B:
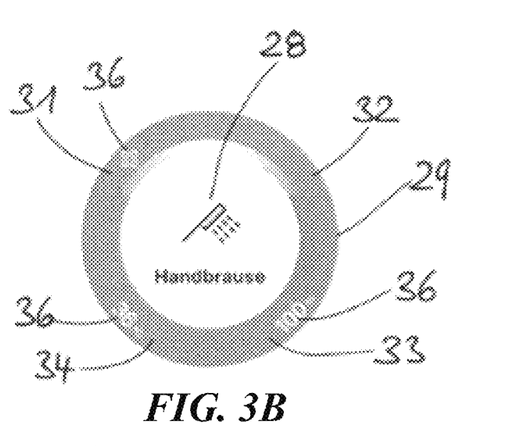
Figure 3C:
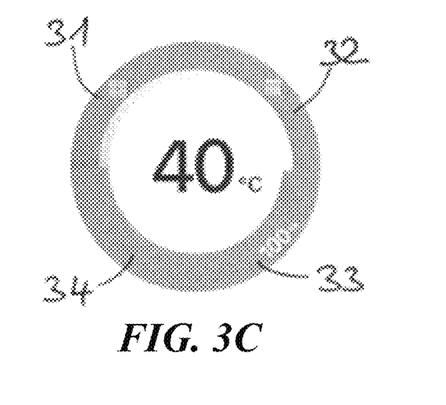
Figure 3D:
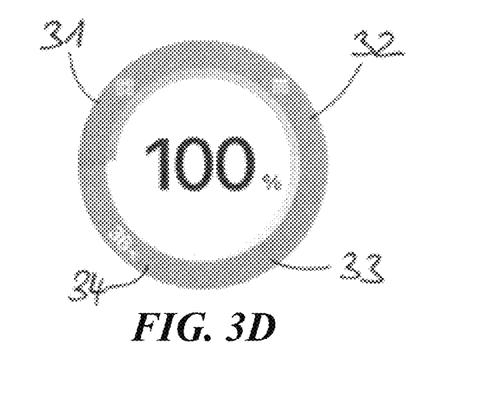

Whereas user interface 17 in FIG. 2 is illustrated in its spatially physical design, its individual elements, parts, components and regions are, for reasons of illustration, isolated from one another in FIG. 1. User interface 17 has a round display 18, a setting-selector ring 19 extending around display 18 and capable of being turned around an axis perpendicular to display 18, with a circumferential gripping face 20 accessible from radially outside as well as four buttons 21 disposed around setting-selector ring 19 and set back relative to this as well as display 18. Setting-selector ring 19 cooperates with a rotary-position transducer 22 of the setting-selector-ring associated with it. According to the functions assigned to them (see below), the four buttons 21 are a program-selection button 23, an outlet-selection button 24, an output button 25 and a temperature button 26. All four buttons 21 have a backlit function symbol 27 symbolizing their function.

Display 18 has a central display region 28 and a peripheral display region 29 surrounding it circularly. The latter comprises, spatially associated with buttons 21, four segments 30 in the form of a program-display segment 31, an outlet-display segment 32, an output-display segment 33 and a temperature-display segment 34.

Electronic control unit 12 is configured such that, after actuation of program-selection button 23 during turning of setting-selector ring 19, a signal supplied by rotary-position transducer 22 of the setting-selector-ring is processed in central data-processing unit 13 in the sense of water-delivery program selection.

By continued turning of setting-selector ring 19, symbols assigned to the individual water-delivery programs stored in program memory 16 and symbolizing them are displayed successively in central display region 28 of display 18. When display 18—which is mounted to be axially movable—is pressed, a momentary-contact confirmation switch 35 is actuated and in this way the water-delivery program displayed via the associated symbol in central display region 28 of display 18 is confirmed or called. It is called by central data-processing unit 13 from program memory 16.

Within the respectively called water-delivery program, the user manually may make individual modifications of characteristic water-delivery parameters via user interface 17, so that the delivery of water—deviating correspondingly from the called program—may be adapted individually to the personal needs. For this purpose, electronic control unit 12 is configured such that a signal supplied by rotary-position transducer 22 of the setting-selector-ring in the sense of a temperature modification after actuation of temperature button 26, a signal supplied by rotary-position transducer 22 of the setting-selector-ring in the sense of a flow modification after actuation of output button 25 and a signal supplied by rotary-position transducer 22 of the setting-selector-ring in the sense of a switch of water outlet after actuation of outlet-selection button 24 are processed in central data-processing unit 13.

Regardless of any control action of user interface 17, automatic switching of the water delivery to hand-held spray 8 takes place when this is removed from holder 9. For this purpose, holder 9 has an embedded sensor (in-use sensor), which generates an in-use signal to be supplied to central data-processing unit 13 upon removal of hand-held spray 8.

Each of the four segments 30 of peripheral display region 29 has a function-value status display 36 of the button function in question. Thus the function-value status display embedded in program-display segment 31 shows—via the program symbol associated with it—the called water-delivery program; and the instantaneous, current function/setting values—possibly resulting from modification of the called program (see above)—for water temperature, water flow and water outlet are displayed by means of function-value status displays 36 embedded in temperature-display segment 34, in output-display segment 33 and in outlet-display segment 32 of peripheral display region 29 of display 18. However, upon actuation of one of the buttons 21, function-value status display 36 in the segment 30 of peripheral display region 29 associated with that button 21 is extinguished; and the instantaneous function/setting value that can be adjusted by means of setting-selector ring 19 after actuation of the button 21 in question is displayed in correspondingly large characters in central display region 28 of display 18, so that the change can be recognized particularly easily by the user. This is illustrated in the subordinate FIGS. 3A to 3D.

Furthermore, electronic control unit 12 is configured such that segments 30 of peripheral display region 29 change color together to correspond to the set water-delivery temperature; thus annular peripheral display region 29 changes color as a whole—in gradual stages—from blue (at low water temperatures) to red (at high water temperatures). Furthermore, at a predetermined time (e.g. two seconds) after the last actuation of user interface 17, the temperature-modification mode, in which turning of setting-selector ring 19 brings about a change of the set temperature, is activated.

In the shower according to FIG. 1, a user identification sensor 37 connected to central data-processing unit 13 is further provided. This is designed as an edge-computing camera 38, which recognizes the respective user on the basis of his or her individual movement pattern. Due to identification of the user in the peripheral equipment, i.e. in edge-computing camera 38, there is no need for communication of the sensed movement data to central data-processing unit 13. The user-identification signal generated in edge-computing camera 38 and supplied to central data-processing unit 13 is evaluated in central data-processing unit 13 for a person-specific preselection of the water-delivery programs offered for selection to user interface 17. This edge-computing camera 38 can be adjusted between a sensing configuration and a blind configuration that can be physically distinguished therefrom, in that, in the latter case, it is lowered completely into a housing 39.

Figure 4:
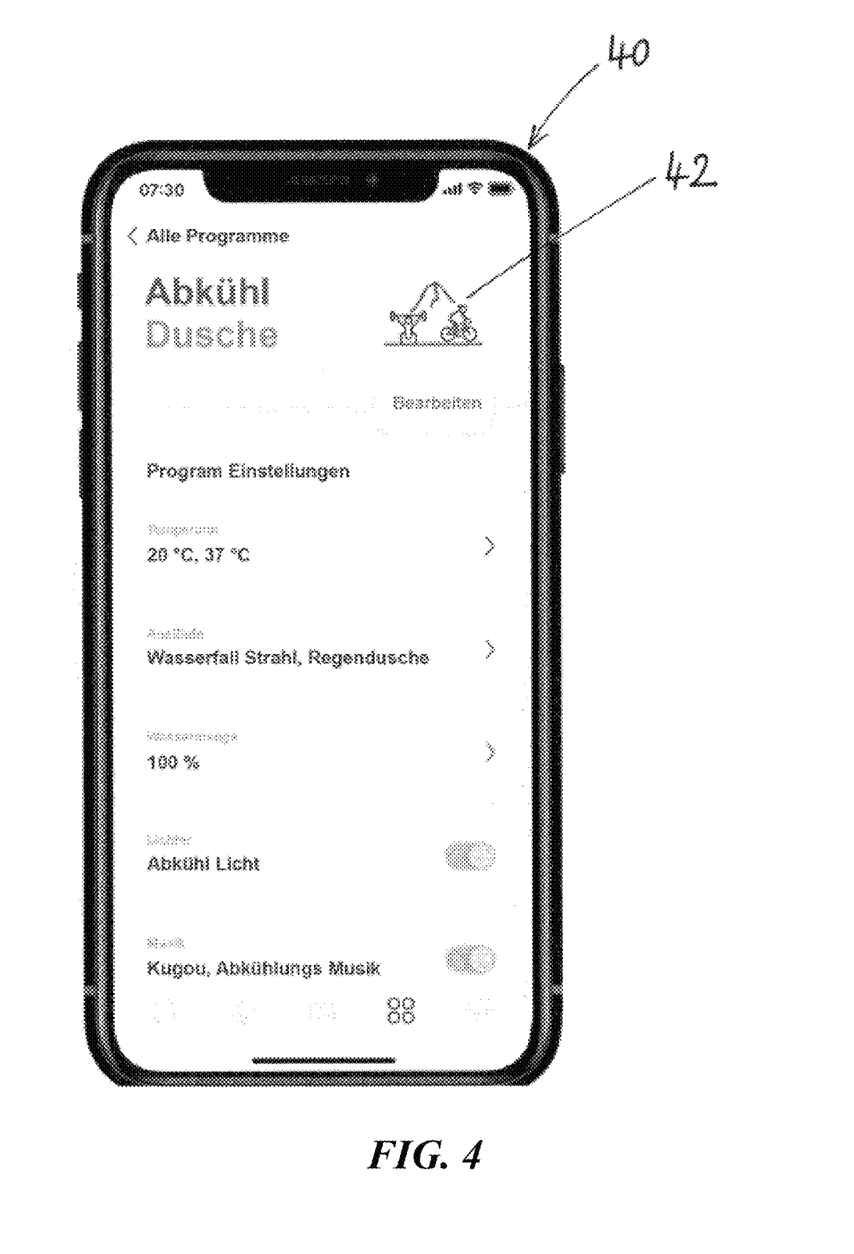
FIG. 4 shows the user interface of an app for programming the shower, installed on a mobile terminal device.

For its programming by means of an external mobile edge device, namely a smartphone 40, on which an app designed and suitable for the purpose is installed, electronic control unit 12 is provided with a data-communication interface 41. FIG. 4 shows, by way of example, a possible smartphone user interface of the corresponding app, and specifically at the level of programming of a specific water-delivery program—in this case called a "Cool Down Shower" and illustrated with a specific pictorial symbol 42, which corresponds to the program symbol displayed on user interface 17. The options of setting (possibly in sequence) of water temperatures, water outlets and water flows are visible. Furthermore, particular individual lighting and sound scenarios can be assigned to the water-delivery program. Other parameters that could be assigned—provided the sanitary facility is equipped with appropriate hardware—to the respective water-delivery program using the programming app may be, for example, addition of a body-care agent to the delivered water, imparting a fragrance to the sanitary facility, generation of heat by means of a heating device, supplying/extracting air by means of a fan, activation of a privacy screen, etc.

What is claimed is:

1. A sanitary facility comprising:
   a cold-water supply;
   a hot-water supply;
   at least one water outlet;
   a metering and mixing valve unit for influencing a total flow through the at least one water outlet and a ratio of a partial quantity of cold water and a partial quantity of hot water in the total flow; and
   a programmable electronic control unit for controlling the metering and mixing valve unit,
   wherein the electronic control unit comprises a program memory for storage of several different water-delivery programs and a central data-processing unit for controlling at least one actuator for operation of the metering and mixing valve unit;
   wherein a user interface of the electronic control unit provides controls for program selection and manual modification of a selected water-delivery program of the several different water-delivery programs;
   wherein the user interface has a display, a setting-selector ring extending around the display and rotatable about an axis perpendicular to the display, a circumferential gripping face accessible from radially outside the setting selector ring, and at least three buttons disposed around the setting-selector ring;
   wherein the setting-selector ring or the display is axially movable for actuation of a confirmation switch;
   wherein three of the at least three buttons of the user interface are a program-selection button, an output button and a temperature button, and wherein upon actuation of a button of the at least three buttons, a signal supplied by a rotary-position transducer of the setting-selector-ring is processed in the central data-processing unit, depending on the corresponding actuated button, to implement a water-delivery program, an output modification within a called water-delivery program, or a temperature modification within a called water-delivery program;
   wherein the display has a central display region and a peripheral display region surrounding it annularly;
   wherein the peripheral display region comprises at least three segments associated spatially with the at least three buttons and respectively having a function-value status display of a corresponding button function; and
   wherein upon actuation of a button of the at least three buttons, a display of the instantaneous setting value of the corresponding button function appears in the central display region.

2. The sanitary facility of claim 1, wherein, by button actuation, the function-value status display of the corresponding button function is extinguished in the associated segment of the peripheral display region.

3. The sanitary facility of claim 1, wherein the segments of the peripheral display region change color to correspond to a set water-delivery temperature.

4. The sanitary facility of claim 1, wherein the temperature modification mode is activated by confirmation of a selection option or automatically at a predetermined time following actuation of the user interface.

5. The sanitary facility of claim 1, wherein water flow through the water outlet is adjustable by the output button.

6. The sanitary facility of claim 1, wherein a total volume of water delivered through the water outlet is adjustable by the output button.

7. The sanitary facility of claim 1, wherein a flow sensor is provided downstream from the metering and mixing valve unit, and a measured value of the flow sensor is supplied to a flow-regulating circuit of the central data-processing unit.

8. The sanitary facility of claim 1, wherein a type or quality of output water is adjustable by the output button.

9. The sanitary facility of claim 1, wherein the sanitary facility has at least two water outlets and one distributing valve for switching the water delivery between the at least two water outlets, wherein the central data-processing unit acts on at least one actuator operating the distributing valve according to an outlet setting applied at the user interface.

10. The sanitary facility of claim 9, wherein the outlet setting is adjustable by the output button.

11. The sanitary facility of claim 9, wherein the outlet setting is adjustable by a fourth button, the fourth button being an outlet-selection button of the user interface, and with which a fourth segment of the peripheral display region of the display of the user interface is associated.

12. The sanitary facility of claim 9, wherein at least one of the at least two water outlets is hand-held, wherein an in-use sensor associated with the corresponding water outlet generates an in-use signal to be supplied to the central data-processing unit.

13. The sanitary facility of claim 1, wherein the sanitary facility is a washing stand, wherein a filling volume or a basin level is adjustable by a fourth button and the setting-selector ring of the user interface, the fourth button being a filling-volume button or a basin-level button, and with which a fourth segment of the peripheral display region of the display of the user interface is associated.

14. The sanitary facility of claim 1, wherein a modification memory stores modifications made individually to a called water-delivery program.

15. The sanitary facility of claim 1, wherein an identification sensor is provided, wherein a user-identification signal generated thereby is supplied to the central data-processing unit to bring about a person-specific preselection of the water-delivery programs offered for selection to the user interface.

16. The sanitary facility of claim 15, wherein the user-identification sensor can be adjusted between a sensing configuration and a blind configuration physically distinguishable therefrom.

17. The sanitary facility of claim 16, wherein the user identification sensor is adjusted to its blind configuration by the central data-processing unit after user identification has been established.

18. The sanitary facility of claim 16, wherein the user identification sensor is adjusted in a situation-based manner to its blind configuration by the central data-processing unit based criteria defined by a ponding user.

19. The sanitary facility of claim 1, wherein a timer is provided, wherein a time signal generated by the timer is supplied to the central data-processing unit to bring about a time-specific preselection of the water-delivery programs offered for selection to the user interface.

20. The sanitary facility of claim 1, wherein the control unit comprises a data-communication interface, especially for inputting program data created on an external device.

21. The sanitary facility of claim 1, wherein a temperature sensor is provided downstream from the metering and mixing valve unit, and a measured value of the temperature sensor is supplied to a temperature-regulating circuit of the central data-processing unit.

22. The sanitary facility of claim 1, wherein the sanitary facility comprises a reservoir container for a body-care product plus a connected metering and dispensing device that discharges upstream from the water outlet, wherein the central data-processing unit actuates the metering and dispensing device for at least one of the water-delivery programs.

* * * * *